(12) United States Patent
Nelson

(10) Patent No.: US 7,381,261 B1
(45) Date of Patent: Jun. 3, 2008

(54) EXPANDED PERLITE ANNEALING PROCESS

(75) Inventor: Christopher R. Nelson, Lindenhurst, IL (US)

(73) Assignee: United States Gypsum Company, Chicago, IL (US)

( * ) Notice: Subject to any disclaimer, the term of this patent is extended or adjusted under 35 U.S.C. 154(b) by 30 days.

(21) Appl. No.: 11/644,596

(22) Filed: Dec. 21, 2006

(51) Int. Cl.
*C04B 14/18* (2006.01)
*B05D 1/00* (2006.01)
*B28B 1/14* (2006.01)
*B28B 1/16* (2006.01)
*B32B 13/08* (2006.01)
*B32B 37/00* (2006.01)
*B32B 37/15* (2006.01)

(52) U.S. Cl. .................. 106/675; 106/678; 106/783; 106/DIG. 2; 156/39; 156/45; 264/333; 432/13

(58) Field of Classification Search ................ 106/675, 106/698, DIG. 2, 783; 156/39, 45; 264/333; 432/13
See application file for complete search history.

(56) References Cited

U.S. PATENT DOCUMENTS

| | | | |
|---|---|---|---|
| 2,853,394 A * | 9/1958 | Ridell et al. ................. | 106/675 |
| 4,457,703 A | 7/1984 | Ross | |
| 4,501,690 A | 2/1985 | Ross | |
| 4,557,883 A * | 12/1985 | Shiuh et al. .................. | 264/43 |
| 4,579,525 A | 4/1986 | Ross | |
| 4,889,747 A * | 12/1989 | Wilson ....................... | 427/221 |
| 4,931,211 A | 6/1990 | Martenson et al. | |
| 5,911,941 A | 6/1999 | Rokhvarger et al. | |
| 5,964,934 A * | 10/1999 | Englert .................... | 106/287.1 |
| 6,054,088 A * | 4/2000 | Alhamad .................... | 264/256 |
| 6,224,341 B1 | 5/2001 | Fricke | |
| 6,403,688 B1 * | 6/2002 | Luongo ...................... | 524/423 |
| 6,846,358 B2 * | 1/2005 | Francis ....................... | 106/695 |
| 2005/0031844 A1 | 2/2005 | Wang | |

* cited by examiner

*Primary Examiner*—Anthony J. Green
(74) *Attorney, Agent, or Firm*—Greer, Burns & Crain, Ltd.

(57) ABSTRACT

This invention is directed to a method of reducing the water demand of expanded perlite that includes obtaining a vibrating screen supported at an angle and placing expanded perlite on the vibrating screen. The expanded perlite is moved over the screen past toward a burner at a rate that heats the expanded perlite to a temperature sufficient to anneal it. The expanded perlite is then moved away from the burner and allowed to cool. Another embodiment of this invention is directed to a method of making a gypsum product. The method includes annealing perlite by the method described above, then preparing a slurry of calcium sulfate hemihydrate, additives, water and the annealed perlite. The slurry is formed into the shape of the gypsum product and allowed to set. This process is particularly useful in making gypsum panels and acoustical panels that benefit from the use of lightweight materials.

13 Claims, 2 Drawing Sheets

EXPANDED PERLITE ANNEALING PROCESS

Figure 1:
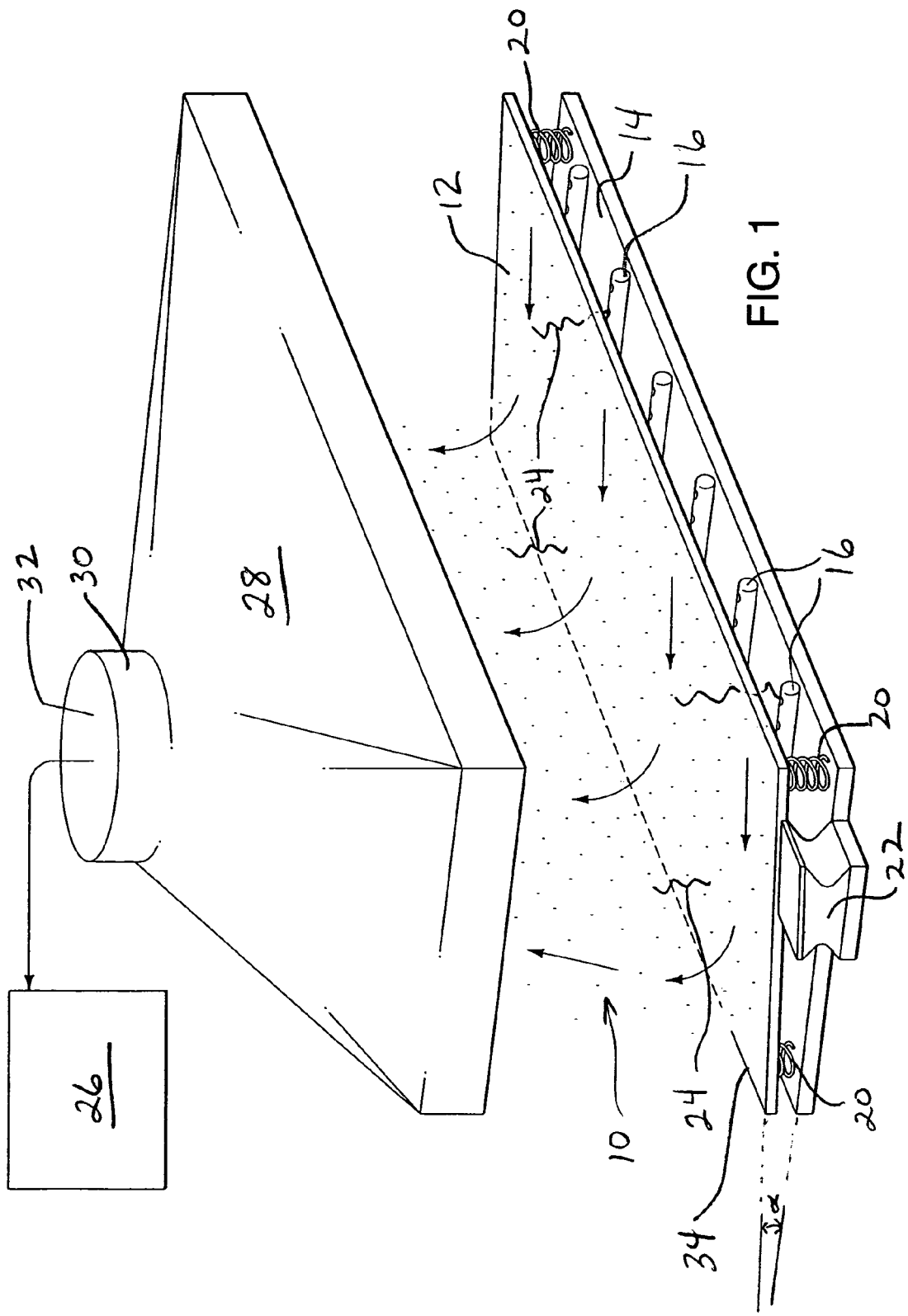

This invention is directed to a method of the water demand of expanded perlite. More specifically, it relates to annealing expanded perlite under certain conditions to reduce its water intake, to reduce the weight of wall panels, ceiling tiles, cement board and the like. Several preferred fillers, such as perlite and vermiculite, expand when heated to between 700° F. and 2000° F. produce a light fluffy material that is extremely light in weight.

Lightweight fillers are commonly used in building materials to reduce product weight. Perlite is a non-crystalline aluminosilicate having an average density of approximately 75 lbs/ft$^3$. It contains a small amount of water. When perlite is heated rapidly, the water turns to steam and the resulting expansion causes the perlite to "pop" like popcorn to produce a lightweight material having a density about one-tenth of the unexpanded material. Following expansion, the surface has a large surface area that includes a large number of cracks and fissures.

This property of the expanded perlite becomes important when the expanded perlite is added to a slurry of calcined gypsum or other building material. A large amount of water is needed to wet the surface because of the large surface area. Water is also held in the cracks and fissures due to capillary action. Although the high water demand of the expanded perlite can be overcome by the addition of additional water or chemical dispersing agents, neither of these solutions is totally satisfactory.

Expanded perlite is useful in a number of gypsum applications, including acoustical tiles and gypsum panels. Gypsum panels, including wallboard, are made by making a slurry of gypsum, additives, including fillers, and water.

Acoustical tiles, also known as acoustical panels, ceiling tiles or ceiling panels, are well known in the building trades for providing a ceiling that is quickly installed, inexpensive and lightweight. The tiles are prepared from a slurry of fillers and binders, most frequently by either a casting process or a felting process.

In the water felting of such a slurry, a dispersion of a filler, a binder and other ingredients flow onto a moving, porous support, such as that of a Fourdrinier or Oliver mat forming machine for dewatering. The dispersion dewaters first by gravity and then vacuum suction means. The wet basemat is dried in heated convection drying ovens and the dried material is cut to the desired dimensions and optionally top coated, such as with paint, to produce acoustical tiles and panels.

Acoustical tile is also made by a wet pulp molded or cast process such as that described in U.S. Pat. No. 1,769,519. A molding composition that includes fibers, fillers, colorants and a binder is prepared for molding or casting the body of the tile. This mixture is placed upon suitable trays which have been covered with paper or a metallic foil and them the composition is screeded to a desired thickness with a screed bar or roller. A decorative surface, such as elongated fissures, may be provided by the screed bar or roller. The trays filled with the pulp are then placed in an oven to dry or cure the composition. The dried sheets are removed from the trays and may be treated on one or both faces to provide smooth surfaces, to obtain the desired thickness and to prevent warping. The sheets are then cut into tiles of a desired size.

Fillers that are very porous are preferred for use in the making of acoustical tiles because they provide good sound absorption properties. The final product should also be lightweight so as to reduce the strain on the suspension system used to hold the acoustical tiles in place. Expanded perlite is a preferred filler material because it provides both high porosity and lightweight.

High porosity of the expanded perlite leads to absorption of water into the pores by capillary action. It has been found that the water in the acoustical ceiling tile dispersion is present essentially in two modes. Free water is defined as water which can be removed mechanically from the furnish, including drainage through the wire, with and without vacuum, and through the press section of the process. Bound water is defined as water bound to cellulose fibers and other components of the solids fraction either by hydrogen bonding or capillary action, and which cannot be removed mechanically, such as by suction or pressing. This bound water can be driven off by heating the basemat to increase the partial pressure of water, driving it from the basemat. However, heating the basemat and all of the water held in the pores is relatively expensive, particularly when the high price of fossil fuels is considered. The water retention value ("WRV") is defined as the weight of the bound water as a percentage of the dry weight of the sample.

The use of silicone compounds are known for treating expanded perlite to reduce the amount of bound water present in the basemat. U.S. Pat. No. 5,964,934, herein incorporated by reference, describes an acoustical panel that utilizes expanded perlite that has been treated with silicone polymers, siloxanes, reactive silane monomers and other silicon compounds to reduce the bound water. However, there are several disadvantages to using silicone compounds. Silicone polymers are expensive. They cost almost four times the cost of other polymers. There are hazards associated with use of silicone polymers. Also, there are detrimental effects on the physical properties of the panels.

Extra water is easily added to the slurry to make the expanded perlite more flowable. A gypsum slurry preferably includes calcined gypsum, fillers and just enough water to form a flowable slurry. It is advantageous to use the least amount of water as possible. After the gypsum panel is formed, it is sent to a kiln for drying. Excess water results in prolonged drying and the associated increase in energy costs.

The use of chemical dispersants is another way to improve the flowability of the slurry without the addition of extra water. Many dispersants are known in the art, including, naphthalene sulfonates, melamine-type dispersants and polycarboxylates. Dispersants are very effective in reducing water, but they also introduce a number of problems. Many dispersants severely retard the set of hydraulic materials. Others can cause excessive bleed or separation of the solid components.

SUMMARY OF THE INVENTION

These and other aspects are met or exceeded by the present invention to a method of treating expanded perlite to reduce water retention and water demand of the perlite. More specifically, the invention is directed to a method of reducing the water demand of expanded perlite that includes obtaining a vibrating screen supported at an angle and placing expanded perlite on the vibrating screen. The expanded perlite is moved over the screen past toward a burner at a rate that heats the expanded perlite to a temperature sufficient to anneal it. The expanded perlite is then moved away from the burner and allowed to cool.

Another embodiment of this invention is directed to a method of making a gypsum product. The method includes reducing the water demand of perlite by the method described above, then preparing a slurry of calcium sulfate hemihydrate, additives, water and the annealed perlite. The slurry is formed into the shape of the gypsum product and allowed to set. This process is particularly useful in making gypsum panels and acoustical panels that benefit from the use of lightweight materials.

The annealed expanded perlite of this invention has the advantage of requiring less water than untreated expanded perlite when making a gypsum-containing slurry. The size of process equipment, including vessels, pumps and transfer equipment can be reduced because the volume of the slurry is less.

Additionally, gypsum products, including wallboard and acoustical tiles, can be made with smaller amounts of chemical dispersing agents. The adverse effects of some dispersing agents on gypsum products is well-known. Significantly, gypsum wall board can be made on a high-speed line with no noticeable set retardation. Gypsum slurry that is not sufficiently set at the knife has the potential to produce panels that are too soft to be transferred to a separate line to be fed to a kiln for drying.

Cost savings is also to be gained by reducing the amount of water that is driven off in the kiln. The presence of less water in the product allows for less water removal capacity thereby decreasing the processing time per unit product and increasing the throughput of the kiln. This includes shorter times in the kiln for drying and/or smaller capacity suction systems that could be utilized. Decreasing the amount of drying time also decreases the amount of energy needed to dry the product and the resulting cost savings. The overall reduction in processing time could also be used to increase the overall plant capacity.

If the products are cast, stronger products can result. Where all of the water is absorbed by the product, a weaker product results when the matrix of gypsum crystals is formed over a larger volume.

DETAILED DESCRIPTION OF THE DRAWINGS

Figure 2:
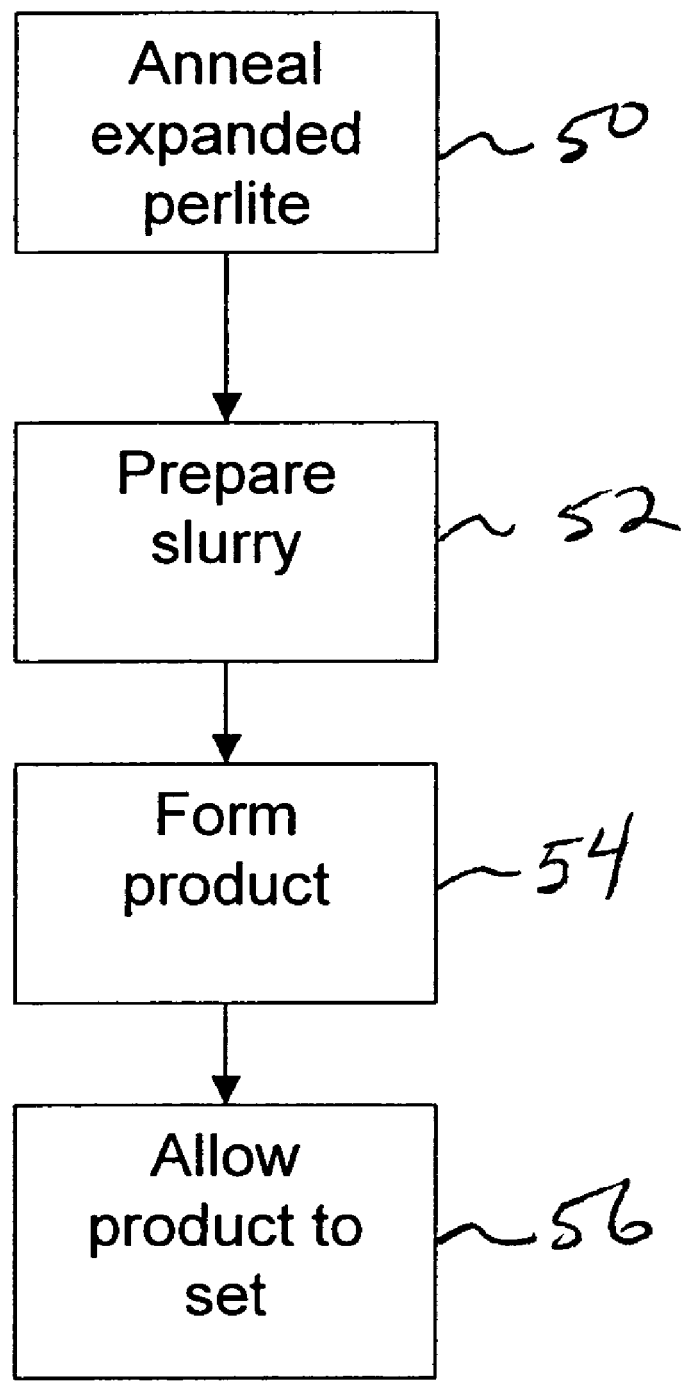

FIG. 1 is a perspective view of one embodiment of an apparatus for annealing expanded perlite; and FIG. 2 is a flow diagram of a process of making a gypsum product.

DETAILED DESCRIPTION OF THE INVENTION

This method reducing the water demand of expanded perlite so that neither a dispersant nor extra water need be added to a product slurry. The starting material, expanded perlite, is either made or purchased commercially. A commercial source of perlite is Silbrico Corp., Hodgkins, Ill.

Perlite generally comprises any glass rock with the capacity to expand on heating, similar to obsidian, and particularly comprises volcanic glass of rhyolitic composition. Perlite generally contains 65-75% silica, 10-20% alumina, 2-5% water and smaller amounts of soda, potash, and lime. When heated to its softening point, the water in perlite, which has turned to steam, expands rapidly, causing the rock to expand like popcorn. The volume of the perlite is increased approximately tenfold forming light, fluffy particles having an average density ranging from about 3 lb/ft$^3$ to about 8 lb/ft$^3$.

In the conventional method of preparing expanded perlite, the perlite ore first ground to a fine size. The perlite is expanded by introducing the finely ground perlite ore into heated air. Typically, the perlite expanding apparatus heats the air to about 1750° F. (950° C.). The perlite falls through the heated air until it becomes hot enough to expand. Due to the change in density, the expanded perlite becomes entrained in the heated air that warmed it and carries it upward where it is collected by a filter, fine screen or other dust collection system. After expansion, the perlite has a large surface area including a large number of cracks, fissures and cavities that are capable of holding a great deal of bound water.

Referring to FIG. 1, the expanded perlite, generally 10, is placed on a vibrating screen 12, such as a vibratory feeder, for annealing. A frame 14 supports the vibrating screen 12. Both are sized to accommodate the needed volume of expanded perlite 10 to be treated. Preferably the frame 14 and the screen 12 are both made of metal or any material that can withstand the high temperatures employed. Metals that are preferred include stainless steel, carbon steel and the like. The screen 12 openings (not shown) are sufficiently small to hold the expanded perlite 10 but large enough to allow enough air to pass through to fluidize the expanded perlite 10

When placing the expanded perlite 10 on the screen 12, it is preferable to spread it in a thin layer of the perlite on the screen to assure even heating. Preferably the expanded perlite 10 is deposited onto the screen 12 in a layer averaging less than ¼ inch (6 mm) in thickness, even more preferably in a layer less than ⅛ inch (3 mm) in thickness. If thick layers of the perlite 10 are used, the portion of the layer closest to a burner 16 will likely sinter before the center and top of the layer is annealed. In this case, the bottom portion of the layer is also likely to stick to the screen 12, gumming up the screen and reducing air flow through it.

Use of any known method of causing the screen 12 to vibrate may be utilized in this method. Vibration of the screen 12 is preferably caused by a biasing element 20 and a vibrator 22 positioned to vibrate the frame. The vibrator 22 and biasing element act together to cause the vibration of the screen 12. The biasing element 20 is biased toward an initial position. As the vibrator 22 acts to push the frame 12 away from the initial position, the biasing element 20 tries to pull the screen back toward the initial position. When the vibrator 22 reverses direction, the screen 12 is guided back to into the initial position by the biasing element 20 This motion is repeated at a rapid rate, causing the screen 12 to vibrate.

Preferably the vibrator 22 is a magnetic, electric or air vibrator. In a preferred vibrator, an eccentric vibrator or a motor having a scotch yoke linkage (not shown) is used to convert the rotary motion of the motor into a vibrating motion. The biasing element 20 is preferably one or more springs. Gravity is also a suitable biasing element when the vibrator 22 is positioned to move the screen in a direction having an upward component.

Traversal of the appended perlite 10 across the screen 12 is accomplished moving the expanded perlite 10 along the screen by gravity. The screen 12 is tilted at an angle to encourage the perlite 10 to traverse the screen. Any angle α is selected that moves the expanded perlite 10 across the screen at a desirable speed for the burner 16 size and the amount of expanded perlite to be processed. The angle α of about 30° to about 50° from a horizontal plane is preferred. As the vibrator 22 pushes the screen in an upward movement, the expanded perlite 10 on the screen 12 is carried in the same direction. Momentum continues to carry the expanded perlite 10 upward and lift off the screen 12 when the vibrator 22 direction reverses. While the expanded perlite 10 is airborne, gravity pulls it downward. Since the screen 12 is slanted, there is a vertical component to the perlite's motion. Gravity acts on the perlite's motion and moves it downward on the screen 12 with each vibration.

The distance traveled across the screen 12 by the expanded perlite 10 is determined by the angle α of the screen and the length of the throw of the vibrator 22. As the screen angle α and the throw length increase, the perlite 10 moves farther down the screen 12 with each vibration. These factors are coordinated with the size of the screen 12 and the burner 16 to allow substantially all of the expanded perlite 10 to attain annealing temperatures.

One of more of the burners 16 is positioned under the screen 12 so that the expanded perlite 10 moves over or near the burner and is heated it to a temperature sufficient to soften the perlite 10 surface to heal many of the surface cracks and fissures. For many perlites 10, this will range from about 800° F. to about 1000° F. Sealing of the fissures reduces the amount of water that is held by the expanded perlite 10. This reduces the amount of water needed to make a flowable slurry. It also minimizes the need for chemical dispersants that can cause adverse effects, such as retarding the set time of the calcined gypsum. Finally, the cost of drying the products is reduced since less water is held in the product. The heating capacity of the burner 16 is sufficient to heat the needed amount of expanded perlite 10 to the annealing temperature.

As it passes the burner 16, the expanded perlite 10 is lifted by an updraft of hot air 24 from the burner 16, through the screen 12 and becomes entrained within it. The air 24 is sufficiently hot to heat the volume of perlite 10 to the annealing temperature. As the expanded perlite 10 is then carried upward, it cools slowly as the warm air 24 moves away from the burner 16. The warm air 24 and expanded perlite 10 are then directed to a system suitable for collection of fine particles 26 as are known in the art. Suitable collection systems 26 include, but are not limited to filters of all types, such as bag filters and cartridge filters, and cyclones. Suction is optionally employed to help direct the expanded perlite 10 into the collection system 26. A hood 28 is useful for accumulating the annealed perlite 10 to a common channel that feeds the collection system 26. Where suction and/or the hood 28 is used, it is constructed to prevent entrainment of the expanded perlite 10 before it has been heated to the appropriate temperature. A hood outlet 32 is preferably oriented toward a lowest edge 34 of the screen 12 so that the perlite 10 traverses most of the width of the screen before becoming entrained in the hot air 24. This improves the efficacy of the annealing process 50 (FIG. 2) by ensuring the perlite 10 reaches annealing temperatures.

Referring now to FIG. 2, the expanded perlite of this invention is useful in gypsum products. After the slurry is made by combining the expanded perlite 10, water and calcium sulfate hemihydrate, the product is formed 54 and allowed to set 56.

In a first preferred embodiment, the gypsum slurry is made 52 from calcium sulfate hemihydrate, additives, water and the expanded perlite. Any calcium sulfate hemihydrate, also known as stucco or calcined gypsum, is used, preferably in amounts of at least 50%. Preferably, the amount of calcium sulfate hemihydrate is at least 75%, at least 80% or at least 85% stucco. In many wallboard formulations, the hydraulic material is substantially all calcium sulfate hemihydrate. Any form of calcined gypsum may be used, including but not limited to alpha or beta stucco. Use of calcium sulfate anhydrite, synthetic gypsum or landplaster is also contemplated, although preferably in small amounts of less than 20%. Other hydraulic materials, including cement and fly ash, are optionally included in the slurry. Amounts of expanded perlite used in this embodiment are from about 3% to about 20%, based on the weight of the calcium sulfate hemihydrate.

Water is added to the slurry in any amount that makes a flowable slurry. The amount of water to be used varies greatly according to the application with which it is being used, the exact dispersant being used, the properties of the stucco and the additives being used. The water to stucco ratio ("WSR") with wallboard is preferably about 0.1 to about 0.8 based on the dry weight of the stucco. Commonly a WSR of about 0.2 to about 0.6 is preferred. Flooring compositions preferably use a WSR from about 0.17 to about 0.45, preferably from about 0.17 to about 0.34. Moldable or castable products preferably use water in a WSR of from about 0.1 to about 0.3, preferably from about 0.16 to about 0.25.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

Additional additives are also added to the slurry as are typical for the particular application to which the gypsum slurry will be put. Set retarders (up to about 2 lb./MSF (9.8 g/m2)) or dry accelerators (up to about 35 lb./MSF (170 g/m2)) are added to modify the rate at which the hydration reactions take place. "CSA" is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators.

Another accelerator, known as wet-gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

In some embodiments of the invention, additives are included in the gypsum slurry to modify one or more properties of the final product. Additives are used in the manner and amounts as are known in the art. Concentrations are reported in amounts per 1000 square feet of finished board panels ("MSF"). Starches are used in amounts from about 3 to about 20 lbs./MSF (14.6 to 97.6 g/m$^2$) to increase the paper bond and strengthen the product. Glass fibers are optionally added to the slurry in amounts of at least 11 lb./MSF (54 g/m$^2$). Up to 15 lb./MSF (73.2 g/m$^2$) of paper fibers are also added to the slurry. Wax emulsions are added to the gypsum slurry in amounts up to 90 lb./MSF (0.4 kg/m$^2$) to improve the water-resistency of the finished gypsum board panel.

Optionally, foam is added to the slurry to further reduce the product weight. In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g. the HYONIC line of soap products from GEO Specialty Chemicals, Ambler, Pa. Foams and a preferred method for preparing foamed gypsum products are disclosed in U.S. Pat. No. 5,683,635, herein incorporated by reference.

A trimetaphosphate compound is added to the gypsum slurry in some embodiments to enhance the strength of the product and to improve sag resistance of the set gypsum. Preferably the concentration of the trimetaphosphate compound is from about 0.07% to about 2.0% based on the weight of the calcined gypsum. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC., St. Louis, Mo. Care must be exercised when using trimetaphosphate with lime or other modifiers that raise the pH of the slurry. Above a pH of about 9.5, the trimetaphosphate loses its ability to strengthen the product and the slurry becomes severely retardive.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the covering or the gypsum core. When used, biocides are used in the coverings in amounts of less than 500 ppm.

In addition, the gypsum composition optionally can include a starch, such as a pregelatinized starch or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

In operation, the gypsum is moved on a conveyor toward a mixer. Prior to entry into the mixer, dry additives, such as dry set accelerators, are added to the powdered gypsum. Some additives are added directly to the mixer via a separate line. Trimetaphosphate was added using this method in the examples described below. Other additives may also be added to the water. This is particularly convenient where the additives are in liquid form. For most additives, there is no criticality regarding placing the additives in the slurry, and they may be added using whatever equipment or method is convenient.

Water and liquid additives are added to the mixer, either combined through a common inlet or separately through different inlets. The combined stucco, expanded perlite and other dry ingredients are added to the mixer. After preparing 52, the slurry, it is discharged from the mixer and flows to the board line where the slurry is poured onto a facing material. Paper is the preferred facing material, but the use of cardboard, fiberglass, plastic sheeting and other facings is contemplated. After the slurry is spread across the width of the facing, an optional second facing is placed atop the slurry to form a continuous sandwich of two paper layers and the slurry between them. The sandwich passes under a screed bar that compresses it to a constant thickness. When about 50% hydration has occurred, the continuous sandwich is cut into individual panels for drying in a kiln.

Another use for the expanded perlite is in ceiling tiles or acoustical panels. In this embodiment, the expanded perlite is the primary filler. It is used in amounts of up to about 85% of the composition by weight. Preferably, the amount of expanded perlite ranges from about 15% to about 70%, based on the weight of the composition.

Preferably, at least one additional filler is a cellulosic fiber, which serves as a bulking agent and provides green strength. The cellulose fiber may also function as a binder to retain fines. Several types of cellulosic fiber have been evaluated in these compositions. It is well known to use newsprint or other post-consumer paper in acoustical tile formulations, and both hammer-milled and hydro-pulped newsprint have been evaluated. Newsprint is preferred for price considerations. Refined paper fibers and wood fiber may also be used as the source of cellulosic fiber, however, it has been found that ceiling tiles made of wood fiber, either softwood or hardwood, are more difficult to cut with a knife at the installation site. Furthermore, wood fibers are a more expensive source of the cellulosic fiber. When used, cellulosic fibers are present in amounts up to 75% by weight of the dry panel. Preferably, cellulosic fiber makes up less than 30% of the panel by weight. More preferably, the weight of cellulosic fiber is from about 1% to about 30% or from about 12% to about 28%.

Gypsum is another preferred filler in the panels of the present invention. The gypsum source may be calcium sulfate dihydrate, either uncalcined or calcined to hemihydrate and rehydrated. Alternatively, in some embodiments the gypsum source may be calcined gypsum or calcium sulfate anhydrite rehydrated during panel formation to form an interlocking matrix of dihydrate crystals. The calcined gypsum may be co-calcined with the cellulosic fiber material to form a composite material of cellulose fibers interlocked with calcium sulfate crystals. Another source of both gypsum and cellulosic fibers is waste or scrap gypsum wallboard. Panels made by this process are described in more detail in U.S. Pat. No. 5,320,677, herein incorporated by reference. The scrap can be ground and added to the slurry, or it can be feed material for a co-calcining process. There are many advantages of adding gypsum to acoustical panels, including improved surface hardness and fire resistance.

Other fillers are also useful in the composition of this invention. Mineral wool is a commonly used filler in acoustical tiles. Inorganic fillers, such as clays, mica, wollastonite, silica, perlite and calcium carbonate are also suitable.

Another principle component of the panels is the binder. Although the cellulose fibers may provide sufficient adhesion to function as the sole source of adhesion, it is preferred to also include a secondary binder, such as starch, in the composition. Other binders, such as latex may be used with or without the starch if desired. In some instances, calcium sulfate hemihydrate functions as a binder, forming a matrix of interlocking dihydrate crystals that hold the panel together.

Starch is very cost efficient and is a preferred binder. It is well known to use starch as a binder in acoustical tiles. A starch gel may be prepared by dispersing starch particles in water and heating the starch slurry until the starch is fully cooked and the starch slurry thickens into a viscous gel. A portion of the cellulosic fibers may be incorporated into the starch slurry prior to cooking. The cooking temperature of the starch slurry should be closely monitored to assure full swelling of the starch granules. A representative cooking temperature for cornstarch is about 180° F. (82° C.) to about 195° F. (90° C.). Starch may also be used as a binder without pre-cooking the starch, because it forms a gel during the process of drying the basemat.

A latex binder may be used in place of the starch or the latex may be used in addition to the starch binder. Many of the latex binders useful in acoustical ceiling tile formulations are disclosed in U.S. Pat. No. 5,250,153. It is well known in the art to use thermoplastic binders (latexes) in acoustical tiles based on mineral wool. These latex binders may have a glass transition temperature ranging from about 30° C. to about 110° C. Examples of latex binders include polyvinyl acetate, vinyl acetate/acrylic emulsion, vinylidene chloride, polyvinyl chloride, styrene/acrylic copolymer and carboxylated styrene/butadiene. The ceiling tile of the present invention may be made without starch, calcium sulfate hemihydrate or latex, but preferably at least one of them is present. In the preferred embodiment, the composition includes both starch and cellulosic fibers.

Another optional ingredient in acoustical panels is clay, which is used to improve fire resistance. When exposed to fire, the clay does not burn, it sinters. The composition optionally includes from about 4% to about 10% clay by weight. Many different types of clay may be used, including Ball Clay from Gleason, Tex.; CTS-1 and CTS-2 from KT Clay of Sledge, Miss., Spinks Clay from Gleason, Tex. and old Hickory Clay from Hickory, Ky. Other commercial clays, such as Bentonite and Kaolin are also useful in acoustical tile formulations. In addition, the acoustical compositions of this invention may also contain other ingredients as are well known in formulations of this type. Lightweight aggregates, surfactants and flocculants are also useful and are well known to an artisan of acoustical tile preparation.

Panels are made at least ⅛ of an inch (3 mm) thick according to any known method of making acoustical panels. The process begins by mixing a slurry of the filler, binder and water. Ingredients in liquid form are usually mixed with the measured amount of water before the dry ingredients are added. Where latex binders are supplied in the form of a liquid emulsion, they are mixed with the water prior to the addition of the dry ingredients.

Dry ingredients are measured prior to mixing. These ingredients are optionally dry blended prior to addition to the water. After the dry ingredients are added to the water and any liquid ingredients that are mixed therein, the aqueous composition is mixed until a slurry of uniform consistency is achieved. Once formed, the slurry is transferred from the mixing vessel to form the panels.

If a casting process is used, the slurry is transferred to molds of the desired size and shape where the water is either absorbed by one or more of the ingredients or it evaporates. Absorption includes physical absorption such as capillary action, chemical absorption such as hydration, or both. The panel is optionally removed from the mold once a sufficient amount of water has been absorbed or has evaporated that the panel holds together. After removal from the mold, the panel is further dried, preferably by driving off the water in an oven.

Another well-known method of making acoustical panels is by a felting process. The slurry is poured into a head box that distributes the slurry along the width of the forming table. From the head box, the slurry is deposited onto a felting conveyor on which a filter cake is formed. The filter cake is dewatered by separation of water from the slurry passing through the porous forming surface of the conveyor. As much as 90% of the uncombined water may be removed from the filter cake by the felting conveyor. Dewatering is preferably aided by a vacuum to remove additional water. As much water is preferably removed as practical before the hemihydrate cools and is converted to the dihydrate. The formation of the filter cake and its dewatering are described in U.S. Pat. No. 5,320,677, herein incorporated by reference.

The dewatered filter cake is wet-pressed to further reduce the water content and to compact the filter cake into the desired shape, thickness and/or density. While the filter cake is still able to be shaped, it is preferably wet-pressed into a board or panel of the desired size and thickness. If the board is to be given a special surface texture or a laminated surface finish, the surface is preferably modified during or following this step. The wet-pressing step preferably takes place with gradually increasing pressure to preserve the product integrity.

After rehydration is sufficiently complete for the product to hold its shape, the boards can be cut and trimmed if desired, and sent to a kiln for drying. It is desirable to dry the product under conditions that allows the product core temperature to reach at least 170° F. (77° C.), more preferably, a core temperature of between about 170° F. (77° C.) and about 200° F. (93° C.) is reached.

If desired, openings or depressions are formed on the front side of the panel to absorb sound. The openings are made by scoring, fissuring, pinholing or creating depressions in the basemat by any other means known in the art. Where the panels are cast, the mold could advantageously be shaped to provide the depressions in the cast article. After oven drying, the panels are coated, if desired, with coatings such as those described above that are suitable for the particular application for which the panels are intended.

While particular embodiments of the method of making expanded perlite and gypsum products have been shown and described, it will be appreciated by those skilled in the art that changes and modifications may be made thereto without departing from the invention in its broader aspects and as set forth in the following claims.

What is claimed is:

1. A method of reducing the water demand of expanded perlite, comprising:
 a). obtaining a vibrating screen supported at an angle;
 b). placing expanded perlite on the vibrating screen;
 c). moving the expanded perlite over the screen past a burner at a rate that heats the expanded perlite to a temperature sufficient to anneal it;
 d). moving the expanded perlite away from the burner; and
 e). allowing the expanded perlite to cool.

2. The method of claim 1 wherein said step c) comprises vibrating the screen to move the expanded perlite.

3. The method of claim 2 wherein said step c) comprises utilizing an eccentric vibrator and a biasing element to vibrate the screen.

4. The method of claim 3 wherein the biasing element comprises a spring.

5. The method of claim 1 wherein said expanded perlite has a density of from about 3 lb/ft³ to about 8 lb/ft³.

6. The method of claim 1 wherein said step d) comprises entraining the expanded perlite in a hot air stream.

7. The method of claim 1 further comprising recovering the expanded perlite.

8. The method of claim 1 wherein the angle of said step a) is from about 30° to about 50° from a horizontal plane.

9. A method of making a gypsum product comprising:
   a). reducing the water demand of perlite by the method of claim 1;
   b). preparing a slurry of calcium sulfate hemihydrate, said perlite, additives and water;
   c). forming the slurry into a shape of the gypsum product; and
   d). allowing the calcium sulfate hemihydrate to set.

10. The method of claim 9 further comprising pouring the slurry between at least two sheets of facing material to form a sandwich.

11. The method of claim 10 further comprising passing the sandwich under a screed bar to compress it to a uniform thickness.

12. The method of claim 9 wherein said step c) is one selected from group consisting of water felting and casting of the slurry.

13. The method of claim 9 further comprising drying the gypsum product.

* * * * *

UNITED STATES PATENT AND TRADEMARK OFFICE
CERTIFICATE OF CORRECTION

| | | |
|---|---|---|
| PATENT NO. | : 7,381,261 B1 | Page 1 of 1 |
| APPLICATION NO. | : 11/644596 | |
| DATED | : June 3, 2008 | |
| INVENTOR(S) | : Christopher R. Nelson | |

It is certified that error appears in the above-identified patent and that said Letters Patent is hereby corrected as shown below:

<u>In the Issued Patent</u>:

In the Specification

Column 1, line 4, insert --reducing-- between "method of" and "the water demand".

Column 1, line 55, delete "them" and insert --then--.

Column 2, line 3, delete "lightweight" and insert --weight reduction--.

Column 4, line 20, insert a period --.-- after "perlite".

Column 4, line 22, delete "of the perlite".

Column 4, line 53, delete "appended" and insert --expanded--.

Column 5, line 16, insert --426°C-- after "800°F".

Column 5, line 16, insert --527°C-- after "100°F".

Signed and Sealed this

Fourteenth Day of October, 2008

JON W. DUDAS
*Director of the United States Patent and Trademark Office*